UNITED STATES PATENT OFFICE.

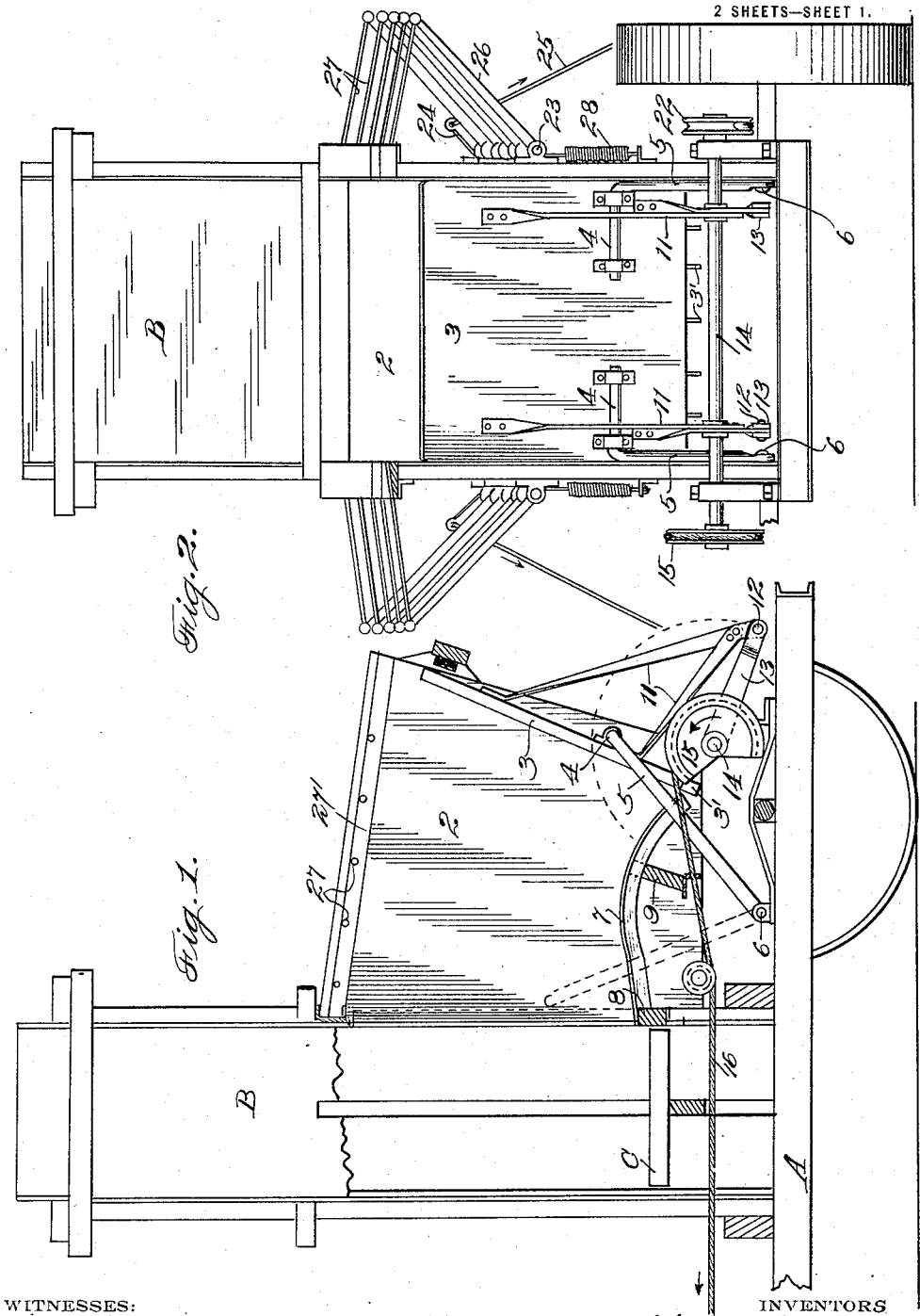

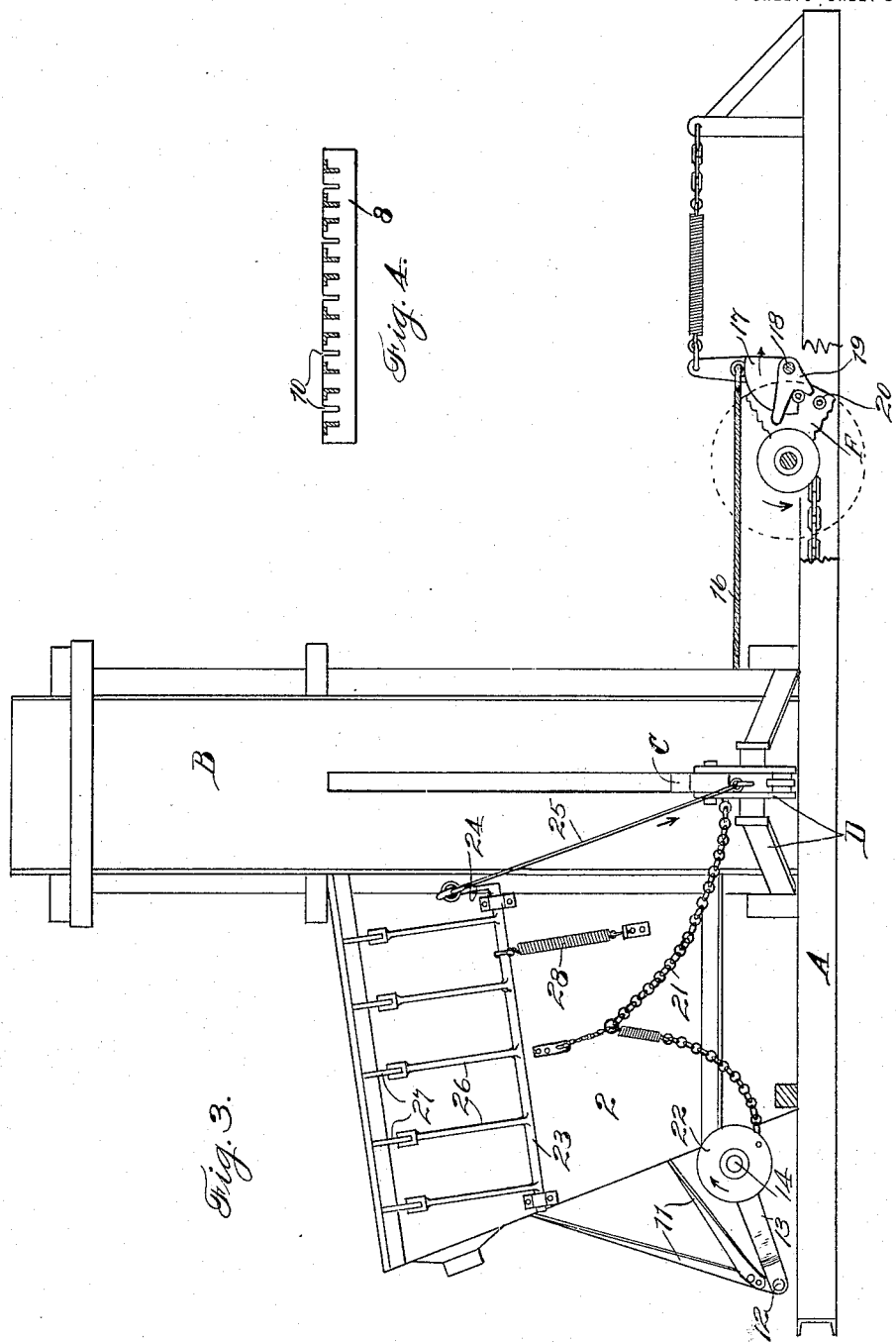

CHARLES L. MILLER, OF OAKLAND, AND LANCE J. TOFFELMIER, OF SAN LEANDRO, CALIFORNIA, ASSIGNORS TO JUNIOR MONARCH HAY PRESS CO., OF SAN LEANDRO, CALIFORNIA, A CORPORATION OF CALIFORNIA.

BALING-PRESS.

1,163,250.  Specification of Letters Patent.  Patented Dec. 7, 1915.

Application filed November 17, 1914. Serial No. 872,559.

*To all whom it may concern:*

Be it konwn that we, CHARLES L. MILLER, of Oakland, county of Alameda, State of California, and LANCE J. TOFFELMIER, of San Leandro, county of Alameda, State of California, citizens of the United States, have invented new and useful Improvements in Baling-Presses, of which the following is a specification.

This invention relates to baling presses and particularly to the feeding mechanism of hay presses.

It is the particular object of this invention to provide a simple, practical, hay-feeding mechanism.

The invention consists of the parts and the construction and combination of parts as hereinafter more fully described and claimed, having reference to the accompanying drawings, in which—

Figure 1 is a sectional elevation of a portion of the press. Fig. 2 is a rear end view of the press omitting one bearing wheel and in partial section. Fig. 3 is a side elevation, opposite of Fig. 1, partly in section. Fig. 4 is a detail of the floor sill.

A is the frame of the machine and B is the baling chamber in which a follower C is reciprocated by suitable mechanism including toggle links D. The links are connected to a suitable "power" shown as including a drum and a wheel F. One side of the chamber B opens into a hopper or box 2 having a rear movable wall, hereafter designated the "feeder" 3. This is pivoted, intermediate its horizontal or top and bottom edges, at 4 upon the upper swinging ends of parallel carrier arms 5 which are pivoted at 6 upon the sides of the main frame A and swing close to and inside of the side walls of the feed box 2. Thus the feeder is mounted upon a floating fulcrum. Its lower edge has projections 3' which sweep between curved, parallel floor members 7 supported upon a sill 8 and a rear joist 9, both notched at 10 to clear the prongs 3'.

The feeder 3 has, on its back, parallel, triangular brackets 11, the apices of which are pivoted at 12 to lever arms 13 which are secured upon a rocker-shaft 14 journaled on the frame A. Over one end of the shaft 14 is a segmental pulley 15 attached by a connection 16, which may be a cable, chain or equivalent, to a device 17, including a segmental pulley operable by the main power and wheel F. The pulley is secured on a rocker-shaft 18 having a peculiar cam 19 engageable by a set of rollers 20 mounted on the wheel F. During each revolution of the power wheel F the rollers engage the rocker-lever 19 and turn the pulley 17 sufficiently to draw up the connection 16 and through the pulley 15 rock the shaft 14. This will cause the levers 13 to thrust the feeder 3 forwardly on its carrier arms 5.

Heretofore presses have been constructed with the feeder 3 rigid on the arms 5, so that while the top edge moved in a long arc from the mouth of the baling chamber, the lower edge nearer the fulcrum 6 stood close to the sill 8, thus forming a restricted bottom area. By the present improvement of mounting the feeder 3 on swinging arms 5, when the crank levers 13 retract the feeder, this rocks upon the fulcrum 4 and the bottom edge assumes a position well back from the carriage, thus affording a large space for receiving hay which is thrown in at the top of the box 2. When the shaft 14 throws the cranks 13 forward, the feeder rocks to a substantially vertical position while advancing and pushing all the hay into the chamber and upon the lowered follower. The prongs 3' gather all the straws on the slat bottom 7 and push them onto the follower, thus effectually cleaning the box and eliminating the troublesome "whiskers" usually resultant beneath the bottom edge of the feeder panel. With the continued rotation of the "power" F the follower is lifted and the charge compressed, after which the follower descends. The follower C is connected (see Fig. 3) by a chain or equivalent 21 to a sheave 22 secured on the crank-shaft 14, the chain winding thereon when the shaft throws the feeder forward. When the follower rises past the top of the feed box 2 the chain is tightened up and reverses the shaft 14, thus retracting the feeder.

In order that the workmen may be continuously employed feeding hay to the feeder box, there are journaled on its sides rocker-shafts 23, each with a lever 24 at one end. The levers 24 are connected by suitable means, as cables 25, to the follower toggle D. These shafts have parallel arms 26, pivoted on the ends of which are fork rods 27. These rods slide in fixed guides 27' along the top edges of the box sides. When the feeder is back and the follower is down, the latter holds the shaft levers 24 rocked outward, thus laterally retracting the fork prongs from an inner position and allowing the hay to be thrown directly into the box. As the follower moves upward, the connections 25 are slacked and the shafts 23 rocked to throw the opposite forks 27 inward toward each other over the top of the box by respective springs 28. When in the inner position, the forks form a support for hay until they are withdrawn, after the retraction of the feeder, and precipitate the hay into the box.

Having thus described our invention, what we claim and desire to secure by Letters Patent is—

1. In a baling press having a baling chamber, a compressing follower therein, and a feed box communicating with the baling chamber, the combination of a feeder reciprocating in said box and an oscillatory carrier on which the feeder is rockingly mounted.

2. In a baling press having a baling chamber, a compressing follower reciprocating therein, and a feed box communicating with the baling chamber, the combination of a feeder reciprocating in said box, an oscillatory carrier on which the feeder is rockingly mounted, and an intermittently operating power means connected to said feeder.

3. In a baling press having a baling chamber, a compressing follower therein, a feed box communicating with the chamber, the combination of a pair of carrier arms pivoted at their lower ends upon a stationary part of the press, a feeder panel forming a movable back for the box and pivoted directly to the swinging ends of said arms, and means connected to said feeder for reciprocating the same.

4. In a baling press having a baling chamber, a compressing follower therein, a feed box communicating with the chamber, the combination of a pair of carrier arms pivoted at their lower ends upon a stationary part of the press, a feeder panel forming a movable back for the box and pivotally mounted upon the swinging ends of said arms for changing its angular to the vertical during movement, and means connected to said feeder for reciprocating the same.

5. In a hay press with a baling chamber and a follower therein, a hay feeder, means for moving the feeder toward and from said chamber comprising a set of swinging carrier arms upon which the feeder is pivoted, a crank shaft for operating the feeder, a power mechanism for actuating the follower and for actuating said shaft to advance the feeder, and means controlled by the follower for actuating said shaft to retract the feeder.

6. In a hay press with a baling chamber and a follower therein, a feeder box communicating with said chamber and having a channeled floor, and a feeder operable in said box with projections in its bottom edge running in said channels for the purpose of gathering, cleanly, the straw from the bottom at each inward reciprocation.

7. In a baling press having a baling chamber, a compressing follower therein, a feed box communicating with the chamber, and a feeder operable in the box for feeding therefrom to the chamber, the combination of a temporary hay support mounted for movement over the feed box, means for moving the feeder to an operative position, means operable by the follower for reversing the movement of the feeder, and means for removing the hay support from over the feed box.

8. In a hay press with a baling chamber and a follower therein, a feeder box communicating with said chamber and having a channeled floor, a feeder operable in said box with projections in its bottom edge running in said channels for the purpose of gathering, cleanly, the straw from the bottom at each inward reciprocation, carrier links, upon the swinging ends of which said feeder is pivoted, and an actuating mechanism connected to the feeder.

9. In a hay press with a baling chamber and a follower therein, a feeder box communicating with said chamber and having a channeled floor, a feeder operable in said box with projections in its bottom edge running in said channels for the purpose of gathering, cleanly, the straw from the bottom at each inward reciprocation, carrier links, upon the swinging ends of which said feeder is pivoted, and an actuating mechanism connected to the feeder and whereby the feeder is rocked on its supports to tilt forward at its upper edge when advanced.

10. In a hay press having a baling chamber and a follower therein, a feeder box communicating with said chamber, a feeder operable in said box, swingingly mounted carrier links, upon the swinging ends of which said feeder is pivoted for tilting movement, and an actuating mechanism connected to the feeder whereby the feeder is rocked on its supporting carrier links to tilt forward at its upper edge when advanced.

11. In a baling press with a baling chamber and a follower movable therein, a feed box communicating with said chamber, a feeder in said box, and slidable means for forming a temporary top to the box while the feeder is in advanced position and is retracting.

12. In a baling press with a baling chamber and a follower movable therein, a feed box communicating with said chamber, a feeder in said box, and means comprising laterally movable fork structures for forming a temporary top to the box while the feeder is in advanced position.

13. In a baling press having a baling chamber, a follower therein, a feed box communicating with the chamber and a feeder in said box, the combination of means for forming a temporary top to the box while the feeder is in advanced position and is retracting, said means being operable by the follower to an inoperative position and comprising laterally movable fork structures, and means for projecting the structures inwardly so that the forks thereof approach across the top of the box.

14. In a baling press having a baling chamber, a follower therein, a feed box communicating with the chamber and a feeder in said box, the combination of means for forming a temporary top to the box while the feeder is in advanced position and is retracting, said means comprising laterally movable fork structures, means connecting the latter to the follower whereby the latter are adapted for moving the structures to an inoperative position, and spring means for projecting the structures inwardly so that the forks thereof approach across the top of the box.

In testimony whereof we have hereunto set our hands in the presence of two subscribing witnesses.

CHARLES L. MILLER.
LANCE J. TOFFELMIER.

Witnesses:
J. C. TOFFELMIER,
ELLIE HOOLEY.

Copies of this patent may be obtained for five cents each, by addressing the "Commissioner of Patents, Washington, D. C."